US008793774B1

(12) United States Patent
Kumar et al.

(10) Patent No.: US 8,793,774 B1
(45) Date of Patent: Jul. 29, 2014

(54) METHODS AND APPARATUS FOR ACCESSING A SECURE NETWORK SEGMENT

(75) Inventors: Jainendra Kumar, Fremont, CA (US); Vineet Dixit, Mountain View, CA (US); Prabhu Seshachellum, San Jose, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 895 days.

(21) Appl. No.: 12/415,361

(22) Filed: Mar. 31, 2009

(51) Int. Cl.
*G06F 21/00* (2013.01)
(52) U.S. Cl.
USPC .................................. 726/6; 726/3; 726/4
(58) Field of Classification Search
USPC ............................................. 713/2; 726/2, 27
See application file for complete search history.

(56) References Cited

U.S. PATENT DOCUMENTS

| | | | |
|---|---|---|---|
| 5,138,615 A | 8/1992 | Lamport et al. | |
| 6,256,739 B1 * | 7/2001 | Skopp et al. | 726/2 |
| 6,816,985 B2 * | 11/2004 | Ali-Santosa et al. | 714/38.14 |
| 6,986,161 B2 | 1/2006 | Billhartz | |
| 7,027,412 B2 | 4/2006 | Miyamoto et al. | |
| 7,234,168 B2 | 6/2007 | Gupta et al. | |
| 2005/0111460 A1 | 5/2005 | Sahita | |
| 2005/0149729 A1 * | 7/2005 | Zimmer et al. | 713/168 |
| 2005/0210533 A1 | 9/2005 | Copeland et al. | |
| 2006/0123480 A1 | 6/2006 | Oh et al. | |
| 2006/0272018 A1 | 11/2006 | Fouant | |
| 2007/0011725 A1 * | 1/2007 | Sahay et al. | 726/4 |
| 2007/0064617 A1 | 3/2007 | Reves | |
| 2007/0067438 A1 | 3/2007 | Goranson et al. | |
| 2007/0094729 A1 | 4/2007 | Hoefelmeyer et al. | |
| 2007/0130210 A1 * | 6/2007 | Park | 707/104.1 |
| 2007/0192861 A1 | 8/2007 | Varghese et al. | |
| 2008/0130517 A1 | 6/2008 | Lee et al. | |
| 2008/0186875 A1 | 8/2008 | Kitani | |
| 2008/0219184 A1 | 9/2008 | Fowler et al. | |

* cited by examiner

*Primary Examiner* — Jung Kim
*Assistant Examiner* — Tri Tran
(74) *Attorney, Agent, or Firm* — Cooley LLP

(57) ABSTRACT

In one embodiment, a method includes receiving a configuration request and a first key from a network device, granting a first class of access to the network device, sending a configuration instruction to the network device, receiving an association request from the network device, and granting a second class of access to the network device. The configuration request and the first key are received at a first time. The network device is outside a secure network segment at a first time. The first class of access is granted based on the first key. The configuration instruction is send in response to granting the first class of access. The association request includes a second key. The granting the second class of access is based on the second key.

19 Claims, 7 Drawing Sheets

METHODS AND APPARATUS FOR ACCESSING A SECURE NETWORK SEGMENT

BACKGROUND

Embodiments described herein relate generally to methods and apparatus for accessing a secure network segment. Some embodiments relate more specifically to methods and apparatus for accessing a secure network segment after memory corruption.

Methods of establishing and accessing secure network segments are known. For example, IEEE 802.1x defines a port-based network access control that can effectively establish a secure network segment. Such known methods, however, fail to provide effective recovery for network devices that experience memory corruption affecting, for example, authentication protocols. Thus, improved methods and apparatus for accessing secure network segments are desirable.

SUMMARY OF THE INVENTION

In one embodiment, a method includes receiving a configuration request and a first key from a network device, granting a first class of access to the network device, sending a configuration instruction to the network device, receiving an association request from the network device, and granting a second class of access to the network device. The configuration request and the first key are received at a first time. The network device is outside a secure network segment at a first time. The first class of access is granted based on the first key. The configuration instruction is send in response to granting the first class of access. The association request includes a second key. The granting the second class of access is based on the second key.

DETAILED DESCRIPTION

Figure 1:
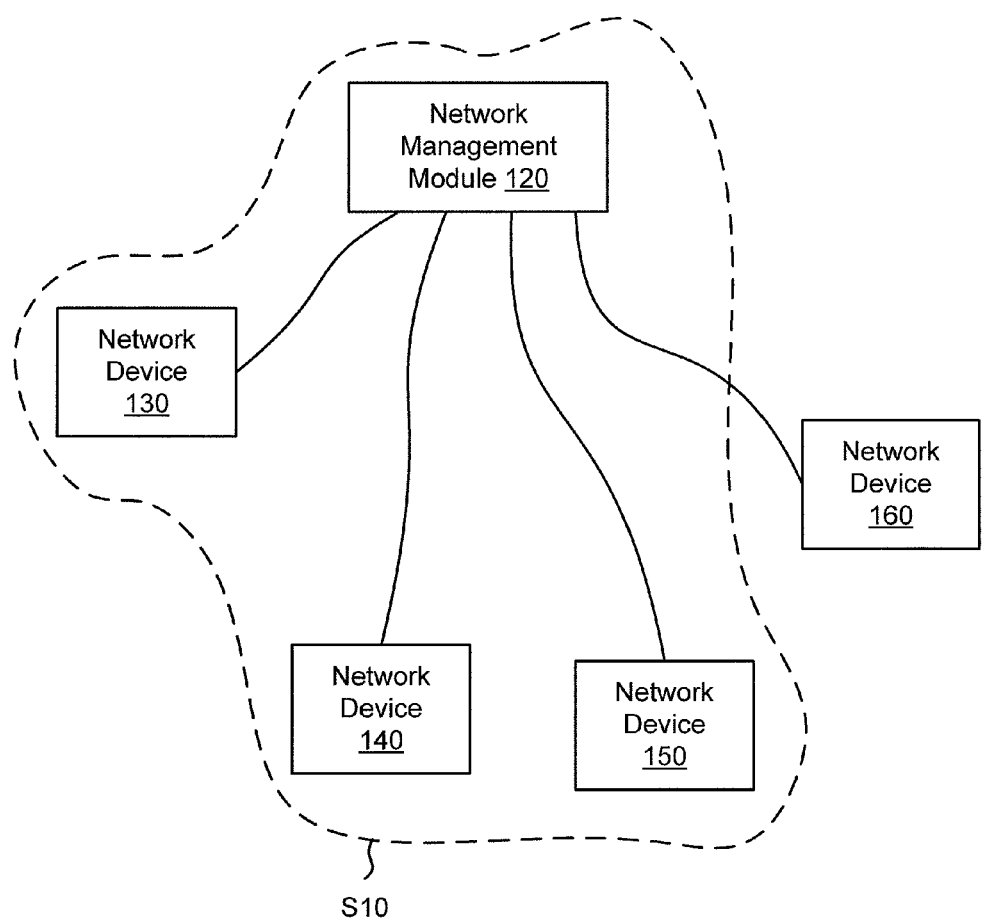
FIG. 1 illustrates a data center network control plane including a secure network segment, according to an embodiment.

In some embodiments described herein, a network device such as a computer server, a network switch, a network router, or a stage of a multi-stage switch can connect to a secure network segment after a memory corruption. For example, a network switch can include instructions stored at a memory within the network switch that are configured to cause the network switch to connect to a secure network segment. These instructions can include one or more keys for authenticating with a network management module and/or protocols such as handshaking or communications protocols for authentication with the network management module. Keys can be, for example, alpha-numeric- or bit-strings, encryption keys, digital certificates, and/or other types of keys for authenticating a network device. The network switch can be configured to execute these instructions on boot (or during a startup or initialization procedure) to join (or gain secure access to) a secure network segment.

Due to the nature of electronic memories, such memories can experience corruption. In other words, the data stored at a memory can become altered due to environmental factors affecting the memory and/or physical factors of the memory itself. If a memory including such instructions becomes corrupted, the network switch may no longer associate with the secure network segment until the memory is restored. Typically, an administrator or operator manually services the network switch to reload the instructions to the memory. This can be particularly problematic in a data center environment in which hundreds or thousands of network devices can experience memory corruption, because the process of reloading the correct, uncorrupted instructions to each network device can be time consuming and, thus, costly. Some embodiments disclosed herein are capable of automatic recovery after a memory failure. In other words, some methods and apparatus disclosed herein can reconfigure a network device within, for example, a control plane of a data center switch fabric such that the network device can join (or rejoin) a secure network segment after a memory failure without manual reconfiguration of the network device (such as reloaded instructions into a memory of the device) by an administrator.

In one embodiment, to avoid manual reloading of instructions at a network switch within a control plane of a data center switch fabric, the network switch can include another memory including instructions for a recovery procedure. This memory can be, for example, a read-only memory ("ROM") or other memory that is unlikely to experience memory corruption. The instructions can be configured to cause the network switch to authenticate with a network management module within the control plane to gain limited access to the secure network segment of the control plane of the data center switch fabric. For example, the network switch can provide a default key included in a ROM to the network management module to gain limited access to the secure network segment. Based on the limited access to the secure network segment, the network switch can download uncorrupted instructions from another network device connected to the secure network segment to replace the corrupted instructions, and write the uncorrupted instructions to the corrupted memory. The network switch can then reboot and authenticate with the network management module for secure (or full) access to the secure network segment based on the downloaded instructions.

As used herein, the term "control plane" refers to portions of the network devices, components, modules, cables, processors, and/or switches of a switch fabric system through which control signals are transmitted, defined, received, and/or the like. For example, the control plane of a switch fabric system can be a portion of the switch fabric system that controls the operation of the switch fabric system. Control signals can include any signal configured to control and/or monitor the operation of the switch fabric system. For example, control signals can control and/or monitor the routing (or switching) of data signals through the switch fabric. A control signal can include, for example, handshaking signals, packet-forwarding information, routing protocols, bridging protocols, error recovery information, routing tables, switch tables, topology-discovery signals, and/or the like. In some embodiments, a control plane can implement an interne protocol ("IP") network to transmit control signals among network devices within the control plane of a data center switch fabric.

As used herein, the term "data plane" refers to the portions of the network devices, components, modules, cables, processors, and/or switches of a switch fabric system through which data signals are transmitted, defined, received, and/or the like. Data signals can include any signal that contains data to be sent between a first network device and/or storage device operatively coupled to the switch fabric system and a second network device and/or storage device operatively coupled to the switch fabric system. Data signals are different than control signals in that data signals are the signals to be transmitted through the switch fabric system and are not used to control and/or monitor the switch fabric system. In some embodiments, for example, a data signal can include a data packet and/or a portion of a data packet such as a cell. If a portion of a component, module, cable, processor, and/or switch transmits, defines, and/or receives both control signals and data signals, that portion of the component, module, cable, processor, and/or switch is part of the control plane of a switch fabric system with respect to the control functionality and part of the data plane of the switch fabric system with respect to the data functionality.

As used in this specification, the singular forms "a," "an" and "the" include plural referents unless the context clearly dictates otherwise. Thus, for example, the term "a network device" is intended to mean a single network device or a combination of network devices; and "network management module" is intended to mean one or more network management module, or a combination thereof.

FIG. 1 illustrates a data center network control plane including a secure network segment, according to an embodiment. As illustrated in FIG. 1, a data center network can include network management module 120, and network devices 130, 140, 150 and 160. In some embodiments, a data center network can include one or more secure network segments such as secure network segment S10. In some embodiments, network devices 130, 140, 150 and 160 are directly operatively coupled to network management module 120, as illustrated in FIG. 1. In some embodiments, network devices 130, 140, 150 and 160 are indirectly operatively coupled to network management module 120 via a communications network. A communication network can include various network interconnect devices and/or modules configured to operatively couple network management module 120, and network devices 130, 140, 150 and 160. For example, a communications network can include a network hub, a network switch, a network router, and/or a network gateway. In some embodiments, a communications network can be a switch fabric such as, for example, a multi-stage switch fabric. In some embodiments, a communications network can be a combination of two or more communications networks operatively coupled one to another via network gateways, network bridges, network switches, and/or other network interconnect devices and/or modules.

In some embodiments, a data center network can include secure network segment S10. Secure network segment S10 can be, for example, a virtual local area network ("VLAN") within a data center network. In some embodiments, secure network segment S10 can be a portion of a network defined by, for example, a group of interconnected ports at network switches that are managed by network management module 120. For example, network devices 130, 140 and 150 can authenticate with network management module 120 before joining secure network segment S10. In some embodiments, a network device can join more than one secure network segments. For example, a network device can be in communication with a group of secure virtual local area networks ("VLANs"). For example, a network device can be an access switch; one subset of the ports of the access switch can be included in one VLAN and another subset of the ports of the access switch can be included in another VLAN. Accordingly, in some embodiments, a network device can authenticate with more than one network management module.

In some embodiments, network device 130 can detect that it has been coupled to network management module 120 (or a communications network operatively coupled to network management module 120) and then authenticate with network management module 120. For example, network device 130 can detect that it has been coupled to a port of a first stage switch in a switch fabric and detect that it is operatively coupled to the switch fabric. After detecting that it is coupled to network management module 120, network device 130 can send an identifier associated with network device 130 and a private key to network management module 120. In some embodiments, the identifier, private key, and related data (e.g., data signals, data packets, data cells, datagrams) can be referred to as authentication network communication (or authentication traffic), and the port of the first stage switch to which network device 130 is operatively coupled can be configured (e.g., by network management module 120) to only allow authentication network communication until network device 130 is authenticated with network management module 120. In other words, the port of the first stage switch can be configured to forward authentication traffic to network management module 120 until the network device operatively coupled to that port is authenticated with network management module 120.

Network management module 120 can receive the identifier and private key from network device 130, and can authenticate network device 130 120 based on the identifier and/or the private key. In some embodiments, a private key can be a device-specific key. For example, the private key can be a hash value based on the identifier and a password accessible to network device 130 and network management module 120. Network management module 120 can receive the identifier and the private key, and generate a local version of the private key at network management module 120 based on the identifier and the password. If the local version of the private key matches (e.g., is identical to) the private key sent by network device 130, network management module 120 can authenticate network device 130. In some embodiments, the private key can be a digital certificate that has been signed by a trusted third party and issued to network device 130. Network management module 120 can validate the digital certificate with the third party after receiving it from network device 130. If the digital certificate is validated by the third party, network management module 120 can authenticate network device 130. In other words, network management module 120 can authorize network device 130 to join or access secure network segment S10. For example, network management module 120 can open a port to which network device 130 is operatively coupled for full access (or secure access) to the secure network segment.

After network device 130 has been authenticated, network device 130 can access other network devices, network resources (services such as storage, databases, and/or other network services provided by network devices within secure network segment S10), and/or other devices or services included in (or operatively coupled to) secure network segment S10. In other words, after network device 130 has been authenticated (or authorized) by network management module 120, network device 130 can join or be added to secure network segment 130. For example, if network device 130 is operatively coupled to a port of a first stage switch in a switch fabric, network management module 120 can configure that port to forward data packets from network device 130 to a network device such as, for example, network device 140 and/or network device 150 as indicated (or identified or addressed) in a destination address field of the data packets rather than to network management module 120. In other words, network management module 120 can open the port of the first stage switch. In some embodiments, network devices 140 and 150 can similarly be added to secure network segment S10.

In some embodiments, a secure network segment can be a portion of a cell-based switch fabric, and a network device can be operatively coupled to an access switch or edge device of the switch fabric. A network management module within the switch fabric can configure the access switch such that authentication traffic from the network device (transmitted as data cells within the switch fabric) is forwarded to the network management module before the network device is authenticated with the network management module. After the network device has been authenticated with the network management module, the network management module can configure the access switch to forward (or route) data packets received from the network device to other network devices operatively coupled to the switch fabric based on a destination parameter in the data packets.

As illustrated in FIG. 1, network device 160 is outside secure network segment S10. In other words, network device 160 is not included in secure network segment S10 and cannot access at least some of the network devices and/or network resources within secure network segment S10. For example, in some embodiments, network device 160 can send authentication traffic to network management module 120, but cannot access a database hosted at a server (not shown) operatively coupled to network device 140.

In some embodiments, network management module 120 can be implemented as one or more hardware modules such as, for example, an application specific integrated circuit ("ASIC"), a field-programmable gate array ("FPGA"), a processor, or other hardware device. In some embodiments, network management module 120 can be implemented as software (e.g., source code, object code, one or more scripts, or instructions) stored at a memory and operable be executed and/or interpreted or compiled at a processor operatively coupled to the memory. In some embodiments, network management module 120 includes both a hardware module and a software module. In some embodiments, network management module 120 can be a portion of an access switch or a switch stage of a multi-stage switch fabric included in a communications network. In some embodiments, network management module 120 can be a portion of or operatively coupled to a control plane within a switch fabric. A control plane can be, for example, a portion of a switch fabric that is configured for communication of control signals between network devices within and/or operatively coupled to the switch fabric. Such control signals can be configured to provide operation instructions to network devices within and/or operatively coupled to the switch fabric. In some embodiments, a control signal can be a data packet, a data cell, or a datagram. A switch fabric can also include a data plane configured for communication of data signals between devices (not shown) such as, for example, computer servers and storage devices operatively coupled to the switch fabric.

In some embodiments, network devices 130, 140 and 150 can be various devices and/or modules operable within a data center network. In some embodiments, a network device can be a stage of a multi-stage switch fabric. In some embodiments, a network device can be an access switch configured to provide access to a switch fabric or other network. In some embodiments, a network device can be a gateway configured to provide an interface, for example, for Ethernet devices to be operatively coupled via a switch fabric or other network. In other words, a network device can be a gateway or switch configured to communicate with devices using different communication protocols and/or communication mediums. For example, in some embodiments, a network device can be operatively coupled to some devices via twisted pair cables and to other devices via fiber optic cables. In some embodiments, a network device can be operatively coupled to some devices configured for communication over an Ethernet protocol and to other devices configured for communication over a fiber channel protocol.

In some embodiments, network management module 120 can provide various classes (or levels or types) of access to network devices and/or network resources within secure network segment S10. For example, network device 160 can communicate with network management module 120 (either directly or indirectly via a communications network) to join secure network segment S10, and can communicate with network device 150 after being authenticated with network management module 120. The communications (or authentication traffic) with network management module 120 can be a first class of access to secure network segment S10. Such a class of access (or access class) can be referred to as a limited class of access to secure network segment S10 because, for example, network device 160 is limited to communication including authentication traffic within secure network segment S10. The communications with network device 150 can be a second class of access to secure network segment S10. This access class can be referred to as a secure access class to secure network segment S10 because, for example, network device 160 is not limited to communication including authentication traffic within secure network segment S10. In other words, network device 160 can communicate with network devices within secure network segment S10 in addition to network management module 120.

In some embodiments, additional classes of access to a secure network segment can exist. In other words, network management module 120 can grant or authorize other classes of access to network devices. For example, network management module 120 can grant limited classes of access to network devices such that the network devices can access some network devices and/or network resources within secure network segment S10, but not other network devices and/or network resources.

In some embodiments, network management module 120 can grant a limited class of access to network device 160 as part of a memory-corruption-recovery procedure. For example, a memory such as a complementary metal-oxide silicon ("CMOS") memory or a junction metal-oxide silicon ("JMOS") memory within network device 160 containing operating instructions or code for network device 160 can become corrupted or erased, and network management module 120 can provide network device 160 with access to a network resource including recovery operating instructions (or configuration instructions) within secure network segment S10. In other words, in some embodiments, a boot memory or file of network device 160 can become corrupted, and network management module 120 can provide network device 160 with limited access to secure network segment S10 to allow network device 160 to download a new boot image from, for example, network device 140. Network device 160 can then use that boot image (e.g., boot from that boot image) to authenticate with network management module 120 for a secure class of access to secure network segment S10.

For example, network device 160 can include a read only memory ("ROM") including a default key that can be provided to network management module 120 to gain or request a limited class of access to secure network segment S10 and download a boot image from network device 150 (or a server operatively coupled to network device 150). A default key can be, for example, a location- or network-specific key. For example, a default key can be installed in a boot ROM of each network device in a data center such that the default key of each network device within the data center is the same. In some embodiments, a default key can be a party-specific key such as, for example, a customer-specific key. For example, a default key can be issued by a manufacturer to a customer and each network device purchased or acquired from the manufacturer by that customer can be programmed with that customer's default key. Thus, the default key can indicate that the device including the default key belongs to a particular party. In some embodiments, a default key can be a network-specific key that is associated with a particular network. For example, a network-specific key can be a default key within a data center.

Network management module 120 can receive the default key and other data or information such as, for example, an identifier associated with network device 160 and/or a request for a boot image from network device 160. Network management module 120 can authenticate network device 160 (for example, as described above with respect to a private key) based on the default key and/or other data provided by network device 160. In some embodiments, a default key can be encrypted when stored at a memory of the network device. The network device can decrypt the default key before sending the default key to the network management module. In some embodiments, the network device can send the encrypted default key to the network management module, and the network management module can decrypt the default key before authenticating the network device based on the default key.

After network management module 120 has authenticated network device 160, network management module 120 can grant a limited class of access to network device 160. For example, network management module 120 can open a port of a switch to which network device 160 is operatively coupled such that network device 160 can access network device 150, but not other network devices. In some embodiments, network management module 120 can configure a switch (such as an access switch) to which network device 160 is operatively coupled to forward data cells from network device 160 network device 150. In some embodiments, network management module 120 can also provide network device 160 with a reference (or path) to a boot image located at network device 150 (or a server operatively coupled to network device 150), and network device 160 can use that reference to locate the boot image at network device 150. In some embodiments, network management module 120 can provide a control signal to network device 150 to limit the access of network device 160 to the boot image. For example, network management module 120 can provide an instruction to network device 150 including an identifier of network device 160 and a reference to the boot image to which network device 160 has been granted access. Network device 150 can then ignore or refuse requests from network device 160 for access to resources or services other than the boot image.

Network device 160 can download the boot image, and store it at, for example, a JMOS memory at which memory corruption has occurred. In some embodiments, the boot image can be compressed and/or encrypted, and network device 160 can expand and/or decrypt the boot image, for example, using an encryption key stored in a ROM. After storing the boot image at the JMOS memory, network device 160 can execute the instructions (or code) stored at the JMOS memory based on the boot image. In some embodiments, network device 160 can reboot itself and execute the code from the boot image during a boot procedure.

In some embodiments, the code included in the boot image includes instructions for authentication with network management module 120 for a secure class of access to secure network segment S10. For example, the boot image can include a private key or instructions for retrieving a private key via a network or from a memory accessible to network device 160. After retrieving the private key, network device 160 can provide the private key and, for example, an identifier of network device 160 to network management module 120 for authentication and secure access to the secure network segment as discussed above.

Figure 2:
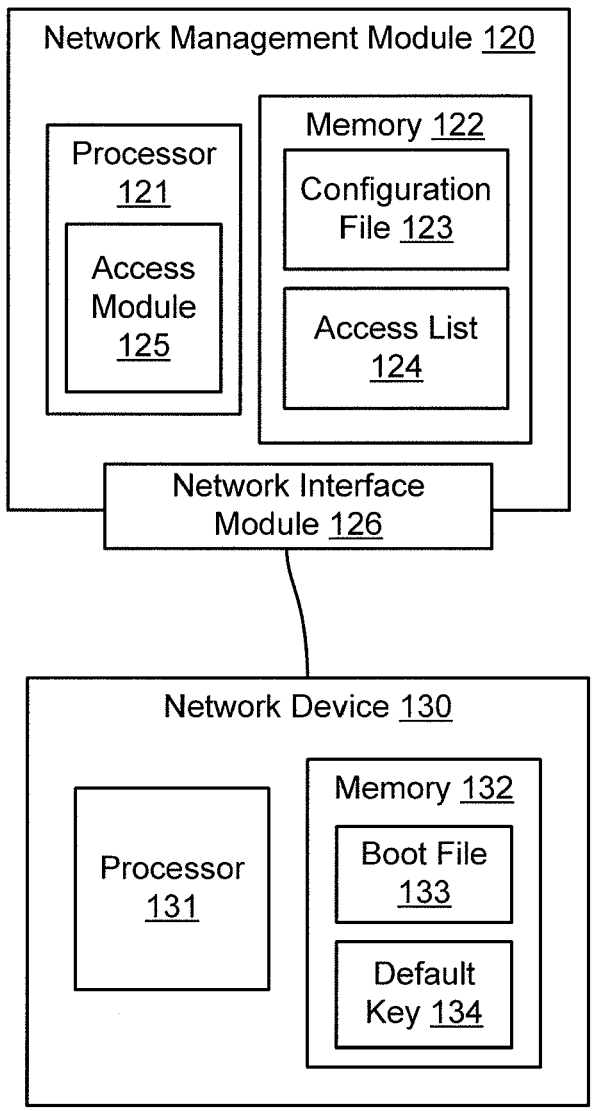
FIG. 2 is a system block diagram of a network device operatively coupled to a network management module, according to an embodiment.

FIG. 2 is a system block diagram of a network device operatively coupled to a network management module, according to an embodiment. Network management module 120 includes processor 121, memory 122, and network interface module 126. Network management module 120 can be operatively coupled to network device 130 via network interface module 126. Network device 130 includes processor 131 and memory 132. In some embodiments, network device 130 includes a network interface module (not shown). As illustrated in FIG. 2, network management module 120 and network device 130 are directly operatively coupled one to another. As discussed in relation to FIG. 1, network management module 120 and network device 130 can be indirectly operatively coupled via a communications network.

Processor 131 of network device 130 can be configured to execute instructions (or code) stored within boot file 133 of memory 132. For example, on boot or restart, processor 131 can execute instructions in boot file 133 to authenticate with network management module 120. In other words, in some embodiments, network device 130 can execute instructions in boot file 133 to join or gain access such as, for example, a secure class of access to a secure network segment. For example, network device 130 can, based on instructions stored at boot file 133, provide a private key and an identifier associated with network device 130 to network management module 120 via network interface module 126. Processor 121 of network management module 120 can be operatively coupled to network interface module 126, and can receive the private key and the identifier. Access module 125 of processor 121 can validate the private key and can determine based on access list 124 and the identifier what class or level of access to grant to network device 130. For example, access module 125 can lookup a permissions list or policy in access list 124 based on the private key and the identifier, and then apply that permissions list or policy to a port (not shown) operatively coupled to network device 130. In some embodiments, access list 124 can have pointers or references to memory locations at which the permissions list or policy are stored rather than the permissions list or policy.

In some embodiments, processor 131 can determine that boot file 133 has become corrupted and request access to an uncorrupted boot file via network management module 120. For example, on boot (or at some other time during initialization or setup) processor 131 can execute a checksum, hash, or other validation method to determine whether boot file 133 is corrupt. If the hash or checksum value generated matches a predefined checksum value (for example, stored at another memory within network device 130), processor 131 can proceed to request access to a secure network segment. If the hash or checksum value generated does not match the predefined checksum value, processor 131 can request an uncorrupted boot file from network management module 120.

Processor 131 can provide default key 134 to network management module 120 via network interface module 126. Processor 121 can receive default key 134 and validate the default key. In other words, processor 121 can determine whether to provide network device 130 with access to an uncorrupted boot file based on default key 134. In some embodiments, processor 131 can provide other information or data to network management module 120 such as, for example, an identifier associated with network device 130 and/or an identifier of a particular uncorrupted boot file or type of uncorrupted boot file. After processor 121 has determined that network device 130 is authorized to access the requested uncorrupted boot file, processor 121 can provide the uncorrupted boot file to network device 130. Said differently, network management module 120 can provide network device 130 with the uncorrupted boot file after authenticating network device 130 based on default key 134.

In some embodiments, as illustrated in FIG. 2, memory 122 of network management module 120 can include configuration file 123. Configuration file 123 can include configuration instructions that can be provided to network device 130 as an uncorrupted boot file. Said differently, configuration instructions included in configuration file 123 can be sent to network device 130 to replace corrupted boot file 133 or one or more portions thereof. For example, boot file 133 can include instructions executable by processor 131 to request access to a secure network segment, and network management module 120 can provide configuration instructions from configuration file 123 to network device 130 in response to a request from network device 130 for an uncorrupted boot file. Configuration instructions can be, for example, instructions that are executable by processor 131 to authenticate network device 130 with network management module 120 for secure access to a secure network segment and/or to configure processor 131 and/or other modules of network device 130 during a boot process of network device 130.

In some embodiments, configuration file 123 can include a boot file image (e.g., a bit copy of an uncorrupted boot file 133), and network management module 120 can provide the boot file image to network device. In some embodiments, configuration file 123 can be stored (or located) at a network device separate from network management module 120 within a secure network segment. Network management module 120 can authorize network device 130 to access the network device including configuration file 123 and download configuration instructions such as, for example, a boot file image from configuration file 123. For example, network management module 120 and network device 130 can each be operatively coupled to an access switch of a multi-stage switch fabric, and a network device that includes configuration file 123 can be operatively coupled to another access switch of the multi-stage switch fabric. Network management module 120 can open a port of the access switch to which network device 130 is operatively coupled and provide network device 130 with a reference to configuration file 123 at the network device that includes configuration file 123. In other words, network management module 120 can open or establish a connection between network device 130 and the network device that includes configuration file 123 such that network device 130 can access configuration file 123. Network device 130 can then download portions of configuration file 123 to replace corrupted portions of boot file 133. In some embodiments, the network device that includes configuration file 123 can push portions of the configuration file (or configuration instructions) to network device 130. That is, network device that includes configuration file 123 can initiate the transmission of the configuration instructions.

In some embodiments, network management module 120 can provide commands and/or instructions to the network device that includes configuration file 123 to authorize network device 130 to access configuration file 123. In some embodiments, network management module 120 can provide commands and/or instructions to the network device that includes configuration file 123 configured to cause the network work device that includes configuration file 123 to send configuration instructions to network device 130 based on an identifier associated with network device 130. In other words, network management module 120 can provide an instruction to the network device that includes configuration file 123 that causes the network device that includes configuration file 123 to send configuration instructions to network device 130 using data packets addressed (e.g., including the identifier associated with network device 130 in a destination field of the data packet) to network device 130.

In some embodiments, network management module 120 can provide commands and/or instructions to the network device that includes configuration file 123 configured to cause the network device that includes configuration file 123 to respond to requests for configuration instructions from network device 130 based on an identifier associated with network device 130. Said differently, network management module 120 can provide an instruction to the network device that includes configuration file 123 that causes the network device that includes configuration file 123 to respond to requests for configuration instructions from network device 130 if the requests include the identifier associated with network device 130 in a source field of the data packet. That is, network management module 120 can authorize the network device that includes configuration file 123 to provide requested configuration instructions to network device 130 if network device 130 identifies itself with an identifier provided to the network device that includes configuration file 123 from network management module 120.

In some embodiments, network management module 120 can authorize the network device that includes configuration file 123 to respond to requests for configuration instructions that come from a port operatively coupled to network device 130 and opened by network management module 120. In other words, network management module 120 can provide an identifier of the port to which network device 130 is operatively coupled to the network device that includes configuration file 123, and the network device that includes configuration file 123 can provide configuration instructions to network device 130 if the configuration instructions are requested from that port. For example, the access switch including the port to which network device 130 is operatively coupled can add or insert the identifier of that port into data packets that include the requests.

After network device 130 downloads or receives the configuration instructions, network device 130 can store or write the configuration instructions to boot file 133 portion of memory 132. Network device 130 can then execute the instructions in boot file 133 (e.g., in response to a self-initiated reboot or reset of network device 130) to join a secure network segment. In other words, network device 130 can recover from a corrupted boot file 133 or repair corrupted boot file 133 based on configuration instructions received from a secure network segment or a network device within a secure network segment.

Figure 3:
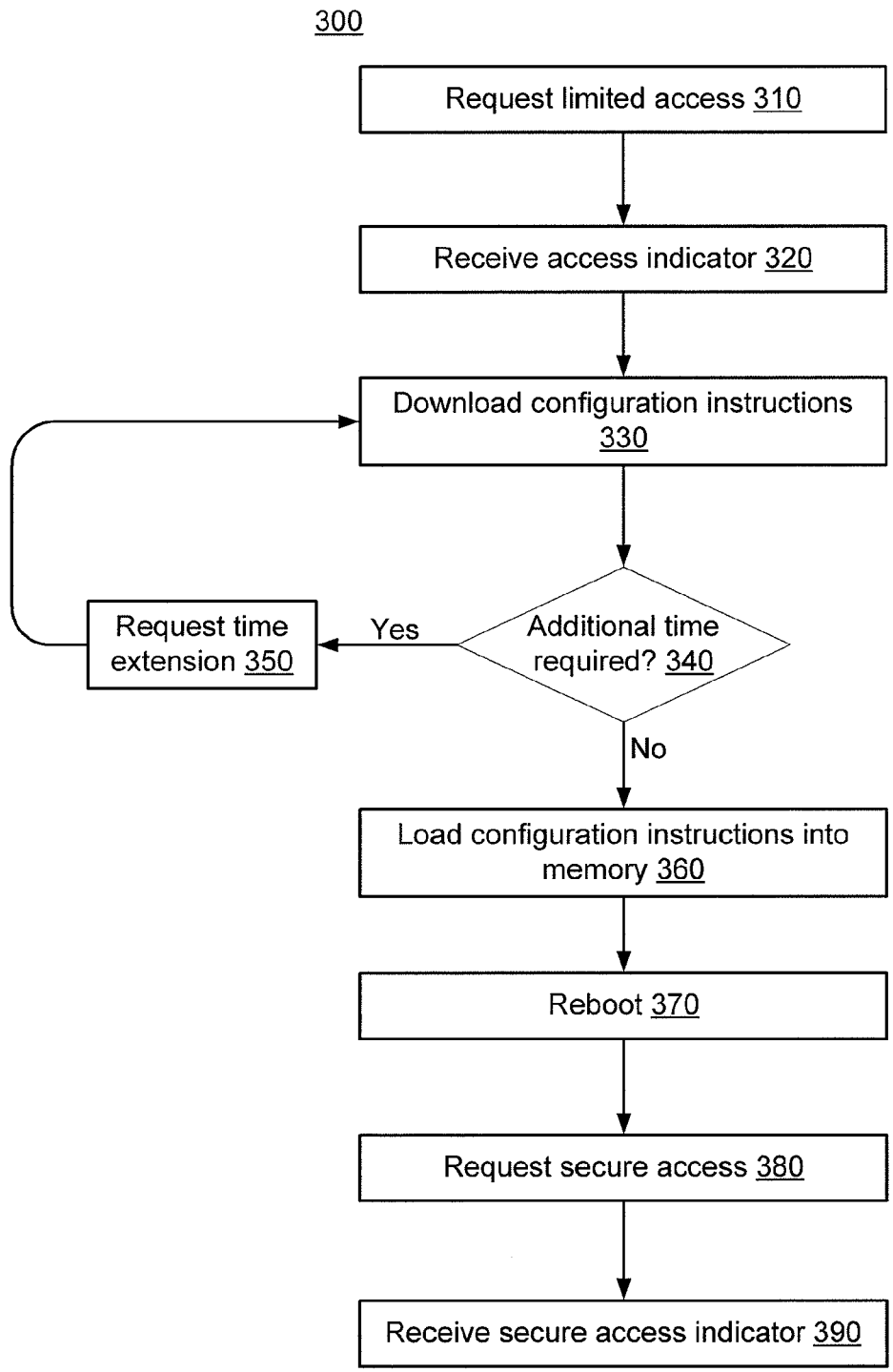
FIG. 3 is a block diagram of a process for accessing a secure network segment, according to an embodiment.

FIG. 3 is a block diagram of process 300 for accessing a secure network segment, according to an embodiment. In some embodiments, process 300 can be implemented at, for example, a network device. For example, processor-executable instructions stored at a memory of a network device can be executed at a processor at the network device to cause the processor to execute the steps of process 300. As illustrated in FIG. 3, limited access to a secure network segment can be requested at, at 310. For example, a network device can request limited access to the secure network segment to download a recovery file or recovery configuration instructions stored within the secure network segment. In some embodiments, a network device can download boot instructions such as, for example, a boot image from the secure network segment each time the network device boots, initializes, or is configured. In some embodiments, a network device can provide a default key with the request for limited access. For example, as discussed above, a network management module can authenticate a network device and/or authorize a network device to access configuration instructions stored within a secure network segment based on a default key.

An access indicator can be received, at 320. In some embodiments, an access indicator can notify or indicate to a network device that the network device has been granted limited access to a secure network segment. In some embodiments, an access indicator can include an description of a level or class of access that has been granted. For example, an access indicator can identify which network devices and/or resources within a secure network segment are accessible based on the class of access. In some embodiments, an access indicator can include a reference to a network resource such as, for example, a server, a database, a configuration or boot file, network device, and/or other network resource accessible to the network device based on the granted class of access. In some embodiments, an access indicator can include a time value or period associated with a time limit of the granted class of access. For example, a class of access can be granted to a network device for a period of time such as ten seconds. The time period can begin when the access indicator is provided, at 320, or when the class of access is first granted. After the time period expires, the class of access can be revoked or terminated (e.g., by a network management module) and the network device can no longer access the secure network segment. Thus, in some embodiments, a class of access can be limited to specific network devices and/or resources within a secure network segment and by a period of time. In other words, limited access can be resource limited and time limited.

At 330, boot or configuration instructions can be downloaded from, for example, a network management module, a network device, and/or a network resource within a secure network segment. In some embodiments, a single configuration instruction or a small number of configuration instructions can be downloaded before a time period associated with the limited access expires. In some embodiments, a large number of configuration instructions (e.g., a boot file image) is downloaded, at 330. In some embodiments, a network device is unable to download all of the configuration instructions before a time period associated with the limited access expires.

In some embodiments, process 300 includes determining, at 340, whether additional time is required to download configuration instructions. If more time is required, a request for a time extension can be sent, at 350. For example, a network device can request a time extension from a network management module. The network management module can then, for example, reset a timer or extend a time period, and not terminate a class of access granted (e.g., not close a network port) until the timer or time period expires. Additional configuration instructions can then be downloaded, at 330. In some embodiments, steps 330, 340, and 350 can be repeated until the configurations instructions are downloaded. In some embodiments, a network management module can refuse or reject a request for a time extension, terminate the class of access, and process 300 can stop before the configuration instructions have been downloaded. In other words, process 300 can fail (or temporarily cease) because a network device does not download the configuration instructions before a time limit expires or a timeout occurs. For example, a network management module can limit the number of time extensions a network device is permitted to request, and can terminate a class of access of the network module if that limit is met or exceeded. In some embodiments, a network device implementing process 300 can return to step 310 after such a failure (or temporary cessation) and request the remainder of the configuration instructions. In other words, a request for limited access can specify which configuration instructions such as, for example, a portion of a boot file image are requested. Thus, after a class of access is again granted, a network device can continue to download configuration instructions, at 330, after a timeout.

Returning to step 340, if additional time is not required (e.g., the configuration instructions have all been downloaded), the configuration instructions are loaded into a memory, at 360, to be executed. For example, the configuration instructions can be loaded into a nonvolatile memory such as a FLASH memory module. In some embodiments, the configuration instructions are loaded into a memory such that corrupted configuration or boot instructions are overwritten with the downloaded configuration instructions. After the configuration instructions are loaded into the memory, at 360, the configuration instructions are executed to, for example, authenticate with a network management module to gain access to a secure network segment.

As illustrated in FIG. 3, a reboot or restart can occur, at 370, to initiate execution of the configuration instructions stored at the memory, at 360. For example, a network device implementing process 300 can load the configuration instructions into a section of a memory from which instructions are executed during a boot procedure of the network device, at 360, and can issue a reboot instruction to restart the network device, at 370. The configuration instructions can include one or more instructions configured to cause a network device to request a secure class of access to a secure network segment, at 380. For example, configuration instruction can include a private key configured to authorize a secure class of access to a network segment. In some embodiments, configuration instructions can include instructions executable by a network device and configured to cause the network device to retrieve a private key, for example, from a memory at the network device or over a network.

An secure access indicator can be received, at 390, in response to a secure class of access being granted. In some embodiments, an access indicator can notify or indicate to a network device that the network device has been granted secure access to a secure network segment. In some embodiments, an access indicator can include an description of a level or class of access that has been granted. For example, an access indicator can identify which network devices and/or resources within a secure network segment are accessible based on the class of access. In some embodiments, a network device can be referred to as being within or part of a secure network segment after receiving a secure access indicator.

In some embodiments, process 300 can include more or fewer steps than illustrated in FIG. 3. For example, in some embodiments no reboot occurs and process 300 can request a secure class of access to a secure network segment after step 360 without rebooting. In some embodiments, process 300 can include requesting and/or receiving status information about, for example, the availability of configuration instructions or a version of a configuration instruction within a secure network segment. In some embodiments, a time extension request can include a password or other data to identify the network device sending the time extension request. For example, a time extension request can include a default key and an identifier of network device. A network management module can receive the default key and the identifier and authenticate (or reauthenticate) the network device before extending a time period. In some embodiments, a network device includes a separate key (e.g., a key other than a default key, a private key, or other key used for authentication) that is included in a time extension request.

Figure 4:
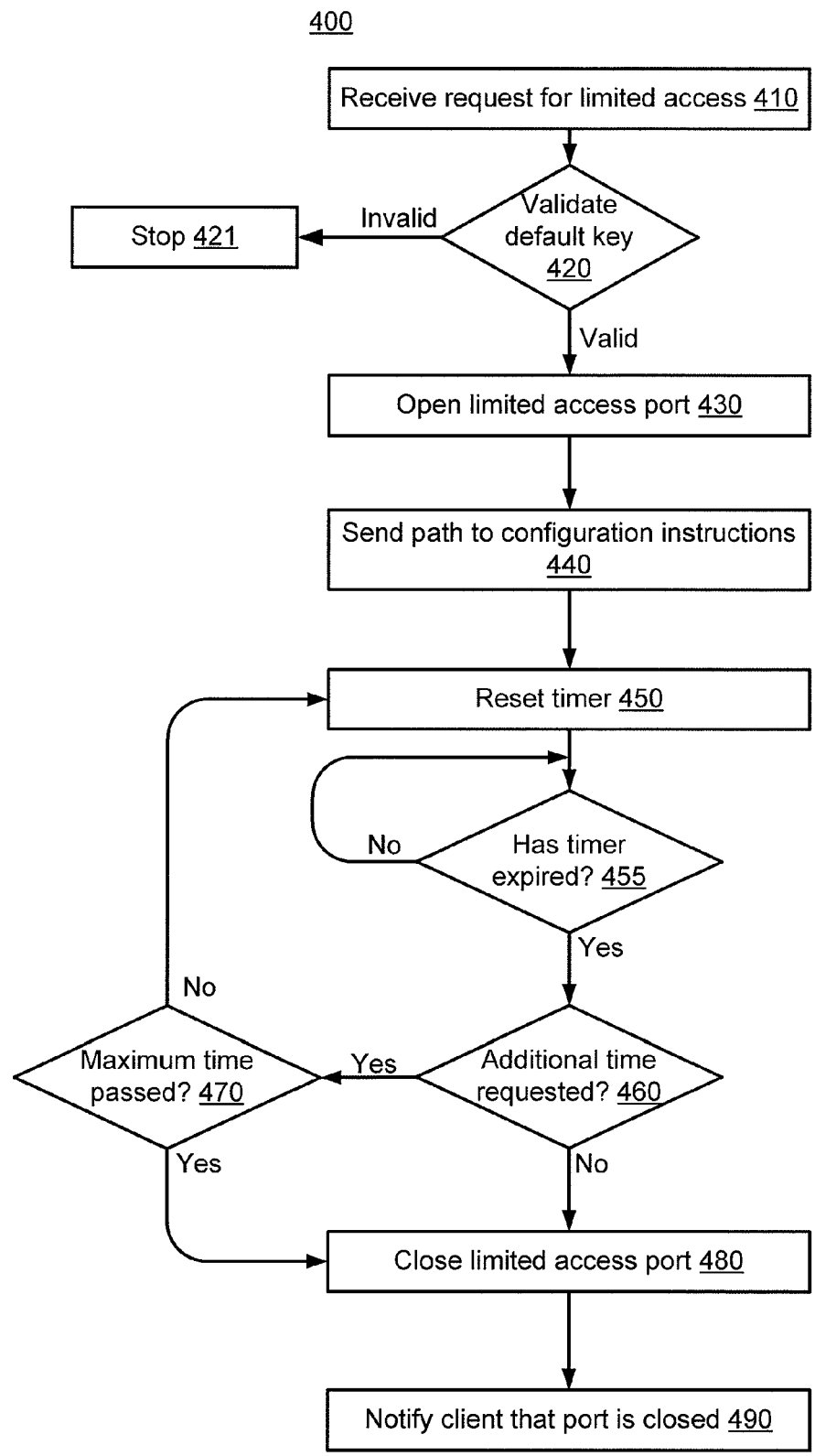
FIG. 4 is a block diagram of a process for providing limited access to a secure network segment, according to an embodiment.

FIG. 4 is a block diagram of process 400 for providing limited access to a secure network segment, according to an embodiment. In some embodiments, process 400 can be implemented at, for example, a network management module. For example, processor-executable instructions stored at a memory of a network management module can be executed at a processor at the network management module to cause the processor to execute the steps of process 400. As illustrated in FIG. 4, a request for limited access to a secure network segment can be received, at 410. A request for limited access to a secure network segment can include a default key, an identifier associated with a network device, a description or identifier of a requested class of access to the secure network segment, and/or an identifier or reference to a network resource within the secure network segment to which access is requested.

The default key can be validated, at 420. For example, the default key can be a hash value based on the identifier of the network device and a password shared by the network device and a network management module implementing process 400. The default key and an identifier associated with a network device can be received, at 410, and a local version of the default key can be generated, at 420, based on the identifier and the password. If the local version of the default key matches (is identical to) the default key sent by the network device, the default key can be validated. In some embodiments, the default key can be a digital certificate that has been signed by a trusted third party and issued to a network device. The default key can be validated, at 420, by validating the digital certificate with the third party after receiving it, at 410. In some embodiments, the default key can be a pre-shared key accessible to the network management module and the network device. If the default key received, at 410, is identical to the pre-shared key, the default key can be validated, at 420. If the default key cannot be validated, at 420, process 400 can stop at 421. In some embodiments, process 400 can send a notification the default key could not be validated before stopping, at 421.

If the key is validated, at 420, process 400 can open a limited access port, at 430. In other words, a network device requesting access to a secure network segment can be provided with limited access to the secure network segment. For example, a port of an access switch to which a network device is operatively coupled can be opened for a limited period of time, at 430. In some embodiments, the port is opened to limited forms of network traffic or communications. For example, a port can be opened for reading (or downloading) data such as configuration instructions from a particular network resource or network device, but not opened for writing data. In some embodiments, a reference or path to a network resource including requested configuration instructions is sent, at 440.

A time period (or timer) is reset, at 450, and process 400 waits, at 455, for the time period to expire. During this time, a client (e.g., network device) can download configuration instructions from a network resource within the secure network segment. After the timer period reset, at 450, expires, process 400 proceeds to step 460. If the time period expires and, at 460, it is determined that no additional time has been requested, the port is closed, at 480, and the client (e.g., network device) is notified that the port has been closed, at 490. In other words, the limited access granted, at 410, is terminated. If a request for additional time (or an extension of the time period) is received before the time period expires, process 400 can continue to step 470. For example, the client can request additional time to complete downloading a configuration instruction or a set or group of configuration instructions such as, for example, a boot file image.

It can be determined, at 470, whether a maximum time period has passed or expired. For example, the time period reset (or set) at 450 can be a heartbeat time period during which a network device should send a heartbeat (e.g., a signal indicating that the network device is active or running) to request that a network management module keep the port open (or not terminate the limited access granted, at 410). The port can remain open for multiple heartbeat time periods up to the maximum time period. In other words, the maximum amount of time that the port opened at 430 can remain open is greater than the time period reset at 450, but extensions of the time period set at 450 should be requested before the time period set at 450 expires. Such requests can be referred to as a heartbeat because these requests are an indication that a client such as a network device is still active or alive (e.g., downloading a boot file image or other configuration instructions from a network management module). If the maximum time has passed (e.g., a maximum number of extensions have been requested), the port can be closed, at 480, and the client is notified that the port has been closed, at 490. If the maximum time has not passed, the time period (e.g., heartbeat time period) can be reset, at 450, and process 400 can continue to step 460.

In some embodiments, process 400 can include more or fewer steps than illustrated in FIG. 4. For example, in some embodiments no time period is set or reset, and not extensions of time are requested. In some embodiments, there is no maximum time period that a port can be open. For example, a client can download a boot file image from a network management module implementing process 400, and the port can remain open during the download.

Figure 5:
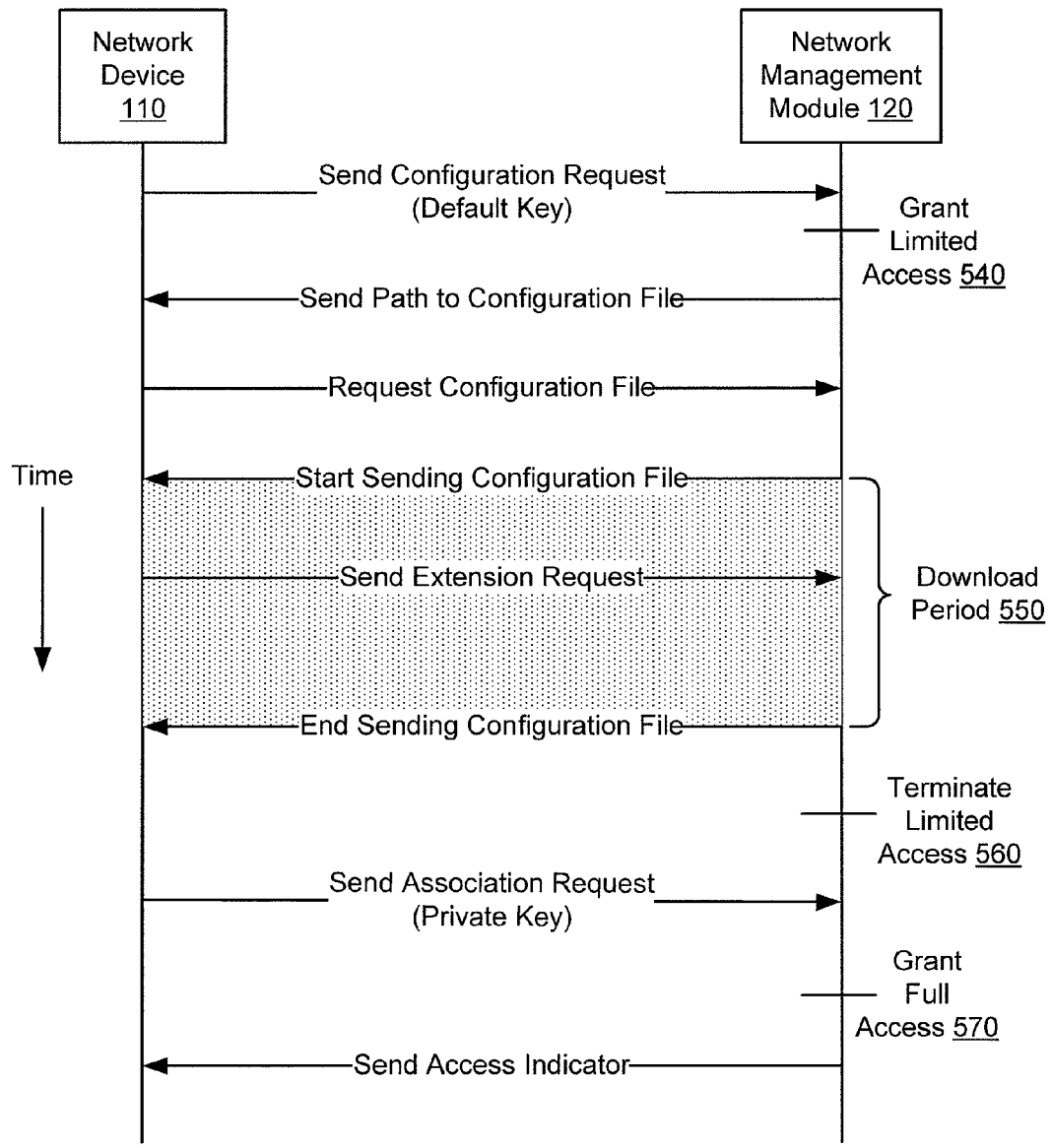
FIG. 5 is a signal flow diagram that illustrates signals transmitted between a network device and a network management module during an access session, according to an embodiment.

FIG. 5 is a signal flow diagram that illustrates signals transmitted between a network device and a network management module during an access session, according to an embodiment. Network device 130 sends a configuration request including a default key to network management module 120. Network management module validates the default key to authenticate network device 130, and grants limited access to a secure network segment to network device, at 540. After granting limited access to the secure network segment, network management module 120 sends a path to a configuration file to network device 130. For example, the configuration file can be stored within a file system accessible to network management module 120. Network device 130 can then request the configuration file from network management module 120 based on the path.

Network management module 120 starts sending the configuration file network device and begins a timer set to a time period at the expiration of which the limited access to the secure network segment will be terminated. Network device 130 also begins a timer. The timer at network device 130, however, is set to expire before the timer at network management module 120. When network device 130 detects that the timer at network device 130 has expired, network device sends an extension request to network management module 120 if network device 130 has not received the configuration file. Network management module 120 receives the extension request and resets the timer at network management module 120. In some embodiments, network management module 120 sends an extension acknowledgment (not shown) to network device 130 if network management module 120 has reset the timer at network management module 120. Similarly, in some embodiments, network management module 120 sends an extension-denied signal (not shown) to network device 130 if network management module 120 has not reset the timer at network management module 120. Network device 130 can reset the timer at network device 130 if an extension acknowledgment is received, or can stop attempting to download the configuration file if an extension-denied signal is received.

In some embodiments, the period of time during which the configuration file is being downloaded can be referred to, as illustrated in FIG. 5, as download period 550. In some embodiments, network management module 120 sends an indication that it has completed sending the configuration file to indicate that download period 550 has completed. After download period 550 has completed, the limited access is terminated, at 560. For example, network management module 120 can close a port that was opened at an access switch operatively coupled to network device 130.

After downloading the configuration file, network device 130 sends an association request to network management module 120 to gain access to (or join) the secure network segment. In some embodiments, as illustrated in FIG. 5, network device 130 sends an association request that includes a private key to network management. Network management module 120 receives the association request and authenticates the network device for access to the secure network segment. For example, network management module 120 can validate the private key and grant full access to the secure network segment, at 570. Said differently, network management module 120 can open a secure (or full-access) port to the secure network segment for network device 130 after authentication of network device 130. In other words, after authentication, network device 130 can join the secure network segment as a trusted network device and access other network devices and network resources within secure network segment. In some embodiments, as illustrated in FIG. 5, network management module 120 can provide an access indicator to network device 130 to indicate that a secure class of access has been granted to network device 130.

Figure 6:
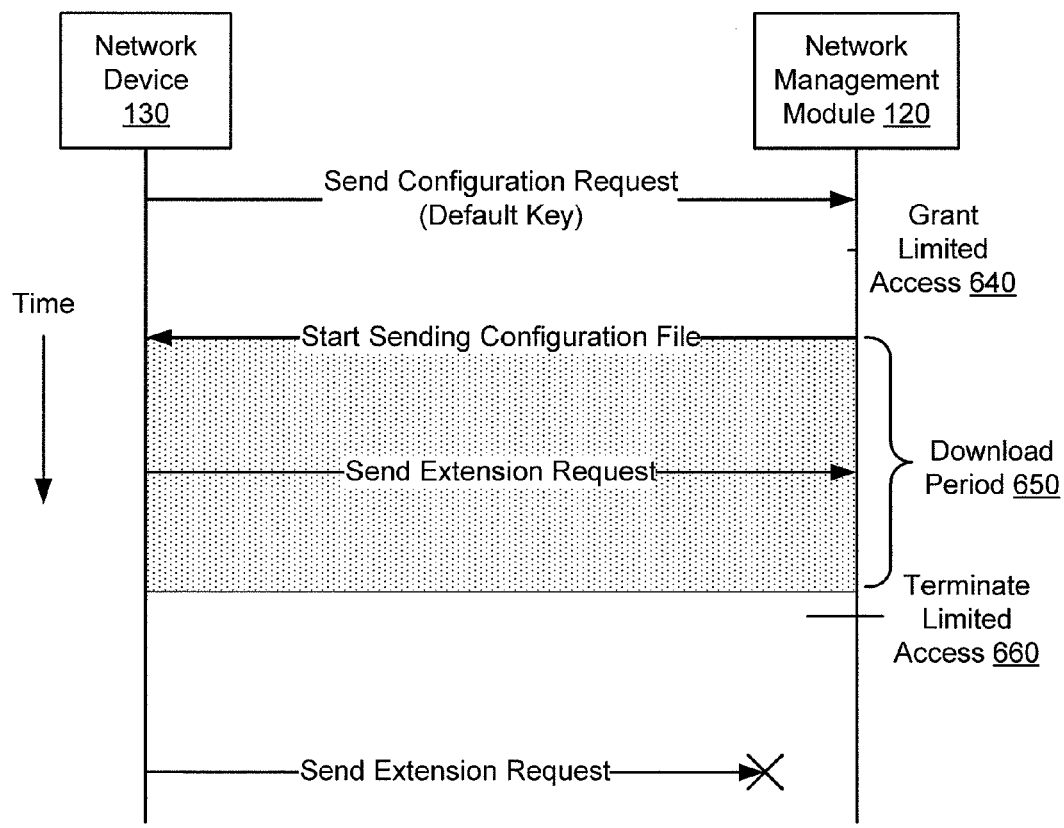
FIG. 6 is a signal flow diagram that illustrates signals transmitted between a network device and a network management module during another access session, according to another embodiment.

FIG. 6 is another signal flow diagram that illustrates signals transmitted between a network device and a network management module during another access session, according to another embodiment. Network device 130 sends a configuration request including a default key to network management module 120. Network management module validates the default key to authenticate network device 130, and grants limited access to a secure network segment to network device, at 640.

Network management module 120 starts sending the configuration file network device. In some embodiments, the period of time during which the configuration file is being downloaded can be referred to, as illustrated in FIG. 6, as download period 650. In some embodiments, network management module 120 begins a timer set to a time period at the expiration of which the limited access to the secure network segment will be terminated. As illustrated in FIG. 6, if network device 130 does not request that the timer set by network management module 120 is reset before that timer expires, the limited access to the secure network segment will expire, at 660, before the configuration file has been received by network device 130. Time extension requests (or keep alive or heartbeats) sent by network device 130 after the limited access is terminated, at 660, will not be received. In some embodiments, network device 130 can initiate communication with network management module 120 after the limited access is terminated by resending the configuration request.

Figure 7:
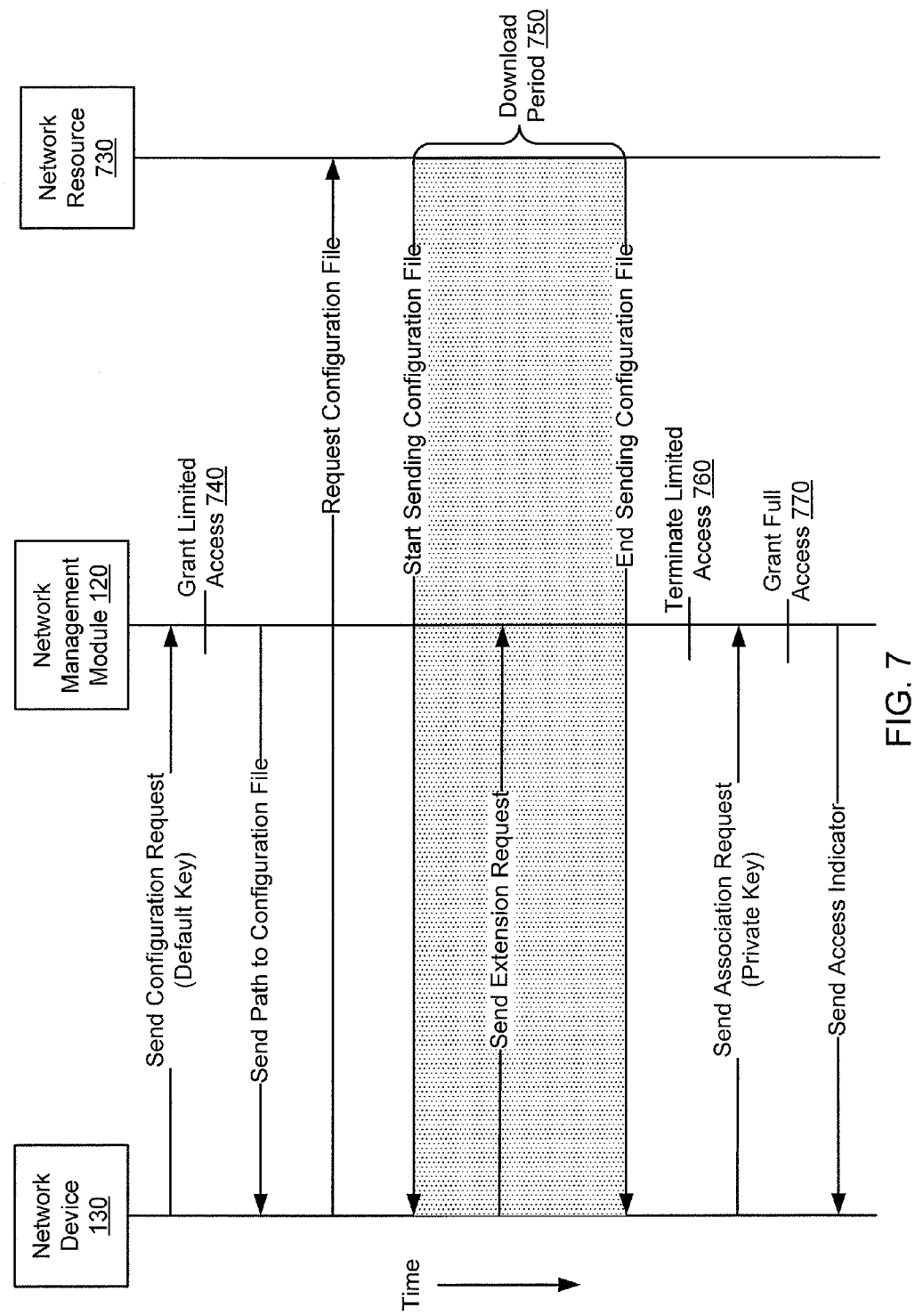
FIG. 7 is a signal flow diagram that illustrates signals transmitted between a network device, a network management module, and a network resource during an access session, according to an embodiment.

FIG. 7 is a signal flow diagram that illustrates signals transmitted between a network device, a network management module, and a network resource during an access session, according to an embodiment. Network device 130 sends a configuration request including a default key to network management module 120. Network management module validates the default key to authenticate network device 130, and grants limited access to a secure network segment to network device, at 740. After granting limited access to the secure network segment, network management module 120 sends a path to a configuration file to network device 130. For example, the configuration file can be stored within at network resource 730. Network resource 730 can be, for example, a file system accessible at a network device within the secure network segment, a database accessible within the secure network segment, or a computer server within the secure network segment. Network device 130 can then request the configuration file from network resource 730.

Network resource 730 starts sending the configuration file network device, and network management module 120 begins a timer set to a time period at the expiration of which the limited access to the secure network segment will be terminated. Network device 130 also begins a timer. The timer at network device 130, however, is set to expire before the timer at network management module 120. When network device 130 detects that the timer at network device 130 has expired, network device sends an extension request to network management module 120 if network device 130 has not received the configuration file. Network management module 120 receives the extension request and resets the timer at network management module 120. In some embodiments, network management module 120 sends an extension acknowledgment (not shown) to network device 130 if network management module 120 has reset the timer at network management module 120. Similarly, in some embodiments, network management module 120 sends an extension denied signal (not shown) to network device 130 if network management module 120 has not reset the timer at network management module 120. Network device 130 can reset the timer at network device 130 if an extension acknowledgment is received, or can stop attempting to download the configuration file if an extension denied signal is received.

In some embodiments, the period of time during which the configuration file is being downloaded can be referred to, as illustrated in FIG. 7, as download period 750. In some embodiments, network resource 730 sends an indication to network device 130 and/or network management module 120 that it has completed sending the configuration file to indicate that download period 750 has completed. After download period 750 has completed, the limited access is terminated, at 760. For example, network management module 120 can close a port that was opened at an access switch operatively coupled to network device 130 in response to expiration of the timer set at network management module 120, or in response to a notification from network resource 730 that network resource 730 has completed sending the configuration file.

After downloading the configuration file, network device 130 sends an association request to network management module 120 to gain access to (or join) the secure network segment. In some embodiments, as illustrated in FIG. 7, network device 130 sends a private key to network management with the association request. Network management module 120 receives the association request and authenticates the network device for access to the secure network segment. For example, network management module 120 can validate the private key and grant full access to the secure network segment, at 770. Said differently, network management module 120 can open a secure (or full-access) port to the secure network segment for network device 130 after authentication of network device 130. In other words, after authentication, network device 130 can join the secure network segment as a trusted network device and access other network devices and network resources within secure network segment. In some embodiments, as illustrated in FIG. 7, network management module 120 can provide an access indicator to network device 130 to indicate that a secure class of access has been granted to network device 130.

Some embodiments described herein relate to a computer storage product with a computer- or processor-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as general purpose microprocessors, microcontrollers, Application-Specific Integrated Circuits (ASICs), Programmable Logic Devices (PLDs), and Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. For example, although certain methods of authentication are discussed, other authentication methods can be used. Any portion of the apparatus and/or methods described herein may be combined in any combination, except mutually exclusive combinations. The embodiments described herein can include various combinations and/or sub-combinations of the functions, components and/or features of the different embodiments described. For example, in some embodiments, features of one module described herein can be included in another module to reduce the number of discrete components of an apparatus. Additionally, in some embodiments, for example, some modules described herein can be implemented in software or code executing on a processor and other modules can be implemented in hardware such as application-specific integrated circuits or semiconductor chips.

What is claimed is:

1. A method, comprising:
    receiving, at a first time from a network device and in response to the network device detecting that a boot portion of a memory of the network device is corrupted, a configuration request that includes a first key, the network device being outside a secure network segment at the first time;
    granting a first class of access to the network device based on the first key;
    sending a configuration instruction to the network device in response to the granting the first class of access;
    receiving an association request that includes a second key from the network device at a second time after the first time;
    granting at a third time after the second time a second class of access to the network device based on the second key, the first class of access being different than the second class of access; and
    resetting, after the sending and before the granting of the second class of access, a timeout value associated with the first class of access in response to an extension request from the network device if a number of extension requests from the network device has not exceeded a predefined threshold.

2. The method of claim 1, wherein the granting the second class of access includes associating the network device with the secure network segment such that the network device is within the secure network segment after the third time.

3. The method of claim 1, wherein the granting the second class of access includes sending a secured access indicator to the network device.

4. The method of claim 1, wherein the first key is a default key associated with a memory-corruption-recovery procedure.

5. The method of claim 1, wherein the configuration instruction is a portion of a boot image including an instruction configured to cause the network device to send the association request.

6. The method of claim 1, wherein the configuration instruction is a reference to a boot image stored at a network resource associated with the secure network segment accessible to the network device based on the first class of access.

7. The method of claim 1, wherein the first key is a network-specific key, the second key is a device-specific key.

8. The method of claim 1, further comprising terminating the first class of access before the granting the second class of access such that the secure network segment is inaccessible to the network device.

9. A method, comprising:
    detecting that a portion of a boot memory of a network device is corrupted;
    sending to a network management module a configuration request that includes a default key in response to the detecting;
    receiving from the network management module a reference to a boot image stored at a network resource different from the network device and the network management module, in response to a limited class of access being granted based on the default key and at a first time;
    receiving, based on the reference to the boot image, a configuration instruction from the network resource;
    modifying, after the receiving, the portion of the boot memory on the network device based on the configuration instruction;
    retrieving, after the modifying, a private key over a network, based on an instruction stored at the portion of the boot memory;
    requesting, before a second time and after the first time, that the first class of access not terminate until a third time after the second time such that the secure network segment grants a time extension if a number of extension requests from the network device has not exceeded a predefined threshold; and
    sending, to the network management module, a request for a secure class of access based on the portion of the boot memory after the modifying, the sending the request for the secure class of access includes sending the private key to the network management module.

10. The method of claim 9, wherein the receiving the configuration instruction includes downloading the configuration instruction from the network resource.

11. The method of claim 9, wherein the modifying includes installing a recovery file at the boot memory based on the configuration instruction.

12. An apparatus, comprising:
    a network interface;
    a memory configured to store a plurality of boot instructions and a default key; and
    a processor operatively coupled to the network interface and the memory,
    the processor configured to request via the network interface a first class of access to a secure network segment based on the default key at a first time,
    the processor configured to receive from the secure network segment the plurality of boot instructions via the network interface, the plurality of boot instructions associated with a second class of access to the secure network segment different from the first class of access, and
    the processor configured to request via the network interface, before a second time and after the first time, that the first class of access not terminate until a third time after the second time such that the secure network segment grants a time extension if a number of extension requests from the processor has not exceeded a predefined threshold, the second time being associated with termination of the first class of access.

13. The apparatus of claim 12, wherein:
    the processor is configured to execute a restart instruction at a fourth time after the third time, and
    the processor is configured to request via the network interface the second class of access to the secure network segment based on the plurality of boot instructions after the fourth time.

14. The apparatus of claim 12, wherein the processor is configured to install the plurality of boot instructions at the memory before the third time.

15. The apparatus of claim 12, further comprising a private key memory operatively coupled to the processor and configured to store a private key, the processor configured to access the private key and send the private key to a network management module associated with the secure network segment after the third time based on the plurality of boot instructions.

16. The apparatus of claim 12, wherein the processor is configured to request the first class of access in response to the processor detecting, before the first time, that at least a portion of the memory is corrupted.

17. The method of claim 1, wherein the configuration instruction includes the second key and at least one boot instruction.

18. The apparatus of claim 12, wherein the processor is configured to receive from the secure network segment a reference to a boot image stored at a network resource different from the memory and the processor in response to the first class of access being granted based on the default key at the first time.

19. The apparatus of claim 12, wherein:
    the processor is configured to receive from the secure network segment a reference to a boot image stored at a network resource different from the memory and the processor in response to the first class of access being granted based on the default key at the first time,
    the processor is configured to access the network resource based on the reference to the boot image, and
    the processor is configured to receive, in response to accessing the network resource, a configuration instruction including the plurality of boot instructions from the network resource.

* * * * *